(12) United States Patent
Dintenfass et al.

(10) Patent No.: US 11,562,128 B2
(45) Date of Patent: Jan. 24, 2023

(54) DATA EXTRACTION SYSTEM FOR TARGETED DATA DISSECTION

(71) Applicant: BANK OF AMERICA CORPORATION, Charlotte, NC (US)

(72) Inventors: Katherine Dintenfass, Lincoln, RI (US); Jon David Neckes, Winchester, MA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 103 days.

(21) Appl. No.: 16/834,544

(22) Filed: Mar. 30, 2020

(65) Prior Publication Data

US 2021/0303780 A1    Sep. 30, 2021

(51) Int. Cl.
 *G06F 40/174*   (2020.01)
 *G06N 5/04*   (2006.01)
 *G06F 16/93*   (2019.01)

(52) U.S. Cl.
 CPC .......... *G06F 40/174* (2020.01); *G06F 16/93* (2019.01); *G06N 5/04* (2013.01)

(58) Field of Classification Search
 CPC .......... G06F 40/174; G06F 16/93; G06N 5/04
 See application file for complete search history.

(56) References Cited

U.S. PATENT DOCUMENTS

| | | |
|---|---|---|
| 6,662,340 B2 | 12/2003 | Rawat et al. |
| 7,660,779 B2 | 2/2010 | Goodman et al. |
| 8,095,476 B2 | 1/2012 | Bierner et al. |
| 8,346,785 B1* | 1/2013 | Benton, Jr. ............ G06Q 30/00 707/756 |
| 9,325,645 B2 | 4/2016 | Wu et al. |
| 9,342,495 B2 | 5/2016 | Kimber et al. |
| 9,436,669 B1 | 9/2016 | Sorensen |
| 10,198,698 B2 | 2/2019 | Jayaraman |
| 10,372,804 B2* | 8/2019 | Hassel .................... G06F 9/453 |
| 2011/0154197 A1* | 6/2011 | Hawthorne ............ G06F 16/41 715/704 |
| 2016/0180279 A1* | 6/2016 | Koerner ................. G06Q 50/01 705/7.15 |
| 2017/0250936 A1* | 8/2017 | Rosenberg .............. H04L 51/02 |
| 2017/0357627 A1* | 12/2017 | Peterson ................. G06F 7/023 |
| 2018/0268337 A1* | 9/2018 | Miller ............ G06Q 10/063114 |

(Continued)

*Primary Examiner* — Kyle R Stork
(74) *Attorney, Agent, or Firm* — Moore & Van Allen PLLC; R. W. McCord Rayburn

(57) ABSTRACT

A system for document extraction and targeted dissection, the system comprising: a memory device; a communication device; and a processing device configured to: receive a first document via communication channel over the network; extract user information from a first data field of the first document, wherein the first data field has a first data type and a first data format; store the user information and the first document in a document database; identify a second document comprising a second data field, wherein the second data field has the first data type; populate, automatically, the second data field of the second document with the extracted user information; display the second document in an electronic presentation via a user interface of a user device; and augment the electronic presentation of the second document in the user interface with supplemental data associated with the second document.

20 Claims, 5 Drawing Sheets

(56) References Cited

U.S. PATENT DOCUMENTS

2019/0087398 A1 3/2019 Kolesov et al.
2020/0012714 A1 1/2020 Anhorn et al.
2021/0233146 A1* 7/2021 Palmert .............. G06F 16/2445

* cited by examiner

DATA EXTRACTION SYSTEM FOR TARGETED DATA DISSECTION

BACKGROUND

The use of electronic documents in lieu of traditional paper copies continues to increase due to convenience and accessibility. Current methods typically depend solely on user input to populate these documents. While some automatic population methods exist, excessive auto-population of documents may lead to user misapprehension and potential incorrect document usage. Therefore, there exists a need for an improved system for intelligently extracting and populating documents with additional data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for document extraction and targeted dissection. The system comprises: a memory device with computer-readable program code stored thereon; a communication device connected to a network; and a processing device, wherein the processing device is configured to execute the computer-readable program code to: receive a first document via communication channel over the network; extract user information from a first data field of the first document, wherein the first data field has a first data type and a first data format; store the user information and the first document in a document database; identify a second document comprising a second data field, wherein the second data field has the first data type; populate, automatically, the second data field of the second document with the extracted user information; display the second document in an electronic presentation via a user interface of a user device; and augment the electronic presentation of the second document in the user interface with supplemental data associated with the second document.

In one specific embodiment, the supplemental data is only displayed with the second document in the user interface.

In another embodiment, the second document has a second data format different than the first data format, and wherein the processing device is further configured to transform the extracted user information from the first data format to the second data format In yet another embodiment, augmenting the electronic presentation of the second document in the user interface with the supplemental data comprises displaying an explanation of the at least a portion of the second document, and wherein the processing device is further configured to: identify a document type or a data type of the second document; generate an explanation associated with the document type or the data type of the second document; and augment the second document with the explanation, wherein the explanation comprises at least one of text, an image, audio, or video. In yet another embodiment, the processing device is further configured to receive an interaction with a portion of the second document from a user via the user interface; and in response to receiving the interaction, generate the explanation associated with the portion of the second document. In yet another embodiment, the interaction with the portion of the second document comprises a click, a highlight, a mouseover, or an amount of view-time on the user interface by the user.

In yet another embodiment, extracting the user information further comprises extracting public external information from third party systems. In yet another embodiment, the processing device is further configured to merge the public external information with the extracted user information in the document database, and wherein the public external information and the extracted user information are used to populate the second document.

In yet another embodiment, the system further comprises an artificial intelligence application stored in the memory device and in communication with the document database, wherein the processing device, using the artificial intelligence application, is further configured to populate the second document and retrieve the supplemental data.

A computer-implemented method for document extraction and targeted dissection is also provided. The computer-implemented method comprises: receiving a first document via communication channel over a network; extracting user information from a first data field of the first document, wherein the first data field has a first data type and a first data format; storing the user information and the first document in a document database; identifying a second document comprising a second data field, wherein the second data field has the first data type; populating, automatically, the second data field of the second document with the extracted user information; displaying the second document in an electronic presentation via a user interface of a user device; and augmenting the electronic presentation of the second document in the user interface with supplemental data associated with the second document.

In a specific embodiment, the supplemental data is only displayed with the second document in the user interface.

In another embodiment, the second document has a second data format different than the first data format, and further comprising transforming the extracted user information from the first data format to the second data format In yet another embodiment, augmenting the electronic presentation of the second document in the user interface with the supplemental data comprises displaying an explanation of the at least a portion of the second document, and further comprising: identifying a document type or a data type of the second document; and generating an explanation associated with the document type or the data type of the second document; and augmenting the second document with the explanation, wherein the explanation comprises at least one of text, an image, audio, or video. In yet another embodiment, the computer-implemented method further comprises: receiving an interaction with a portion of the second document from a user via the user interface; and in response to receiving the interaction, generating the explanation associated with the portion of the second document. In yet another embodiment, the interaction with the portion of the second document comprises a click, a highlight, a mouseover, or an amount of view-time on the user interface by the user.

In yet another embodiment, extracting the user information further comprises extracting public external information from third party systems. In yet another embodiment, the computer-implemented method further comprises merging the public external information with the extracted user information in the document database, wherein the public external information and the extracted user information are used to populate the second document.

In yet another embodiment, the computer-implemented method further comprises populating the second document and retrieving the supplemental data using an artificial intelligence application in communication with the document database.

A computer program product for document extraction and targeted dissection is also provided. The computer program product comprises a non-transitory computer-readable medium comprising computer-readable instructions, the computer-readable instructions, when executed by a processing device, cause the processing device to: receive a first document via communication channel over a network; extract user information from a first data field of the first document, wherein the first data field has a first data type and a first data format; store the user information and the first document in a document database; identify a second document comprising a second data field, wherein the second data field has the first data type; populate, automatically, the second data field of the second document with the extracted user information; display the second document in an electronic presentation via a user interface of a user device; and augment the electronic presentation of the second document in the user interface with supplemental data associated with the second document.

In a specific embodiment, the supplemental data is only displayed with the second document in the user interface.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
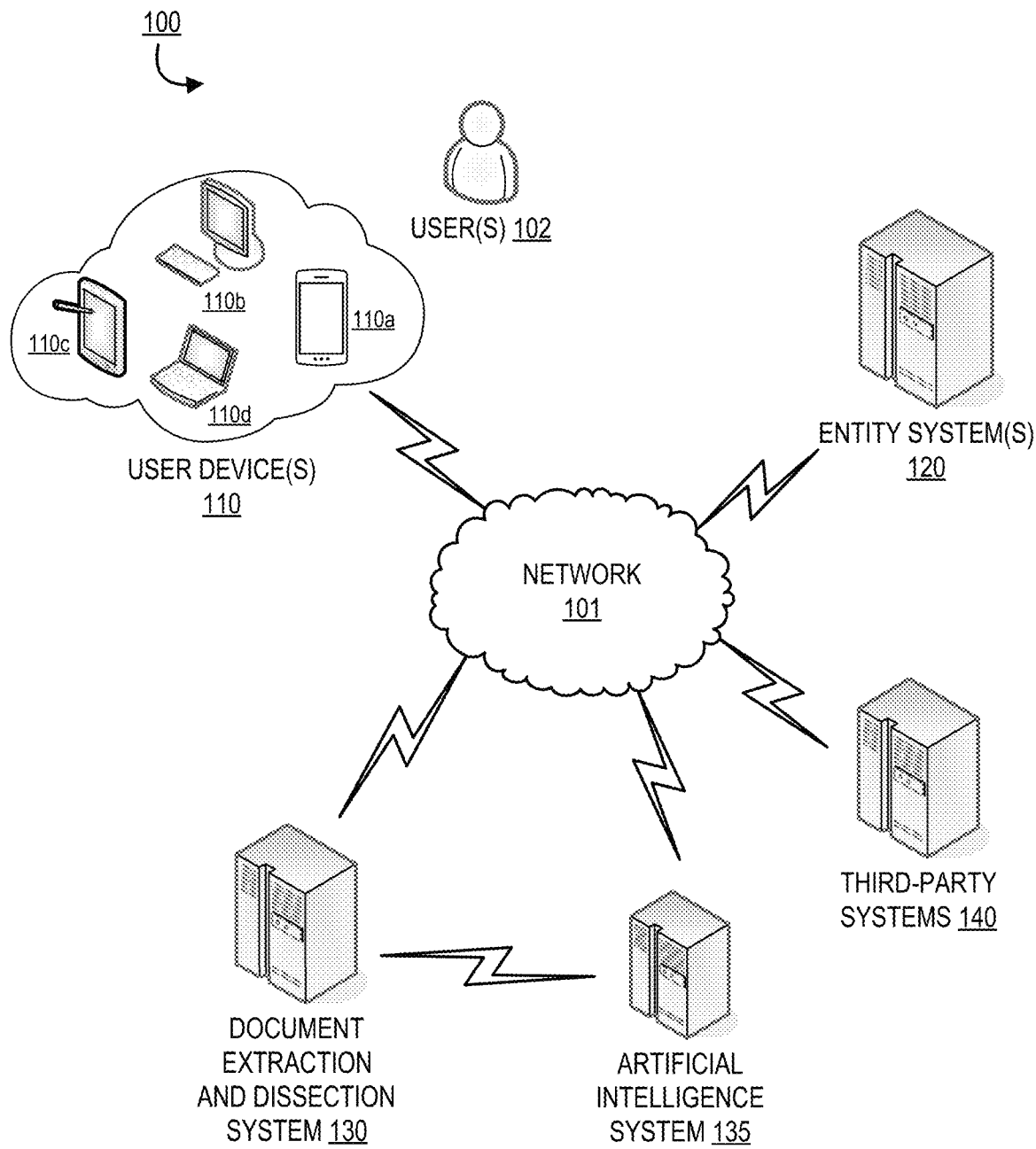
Figure 2:
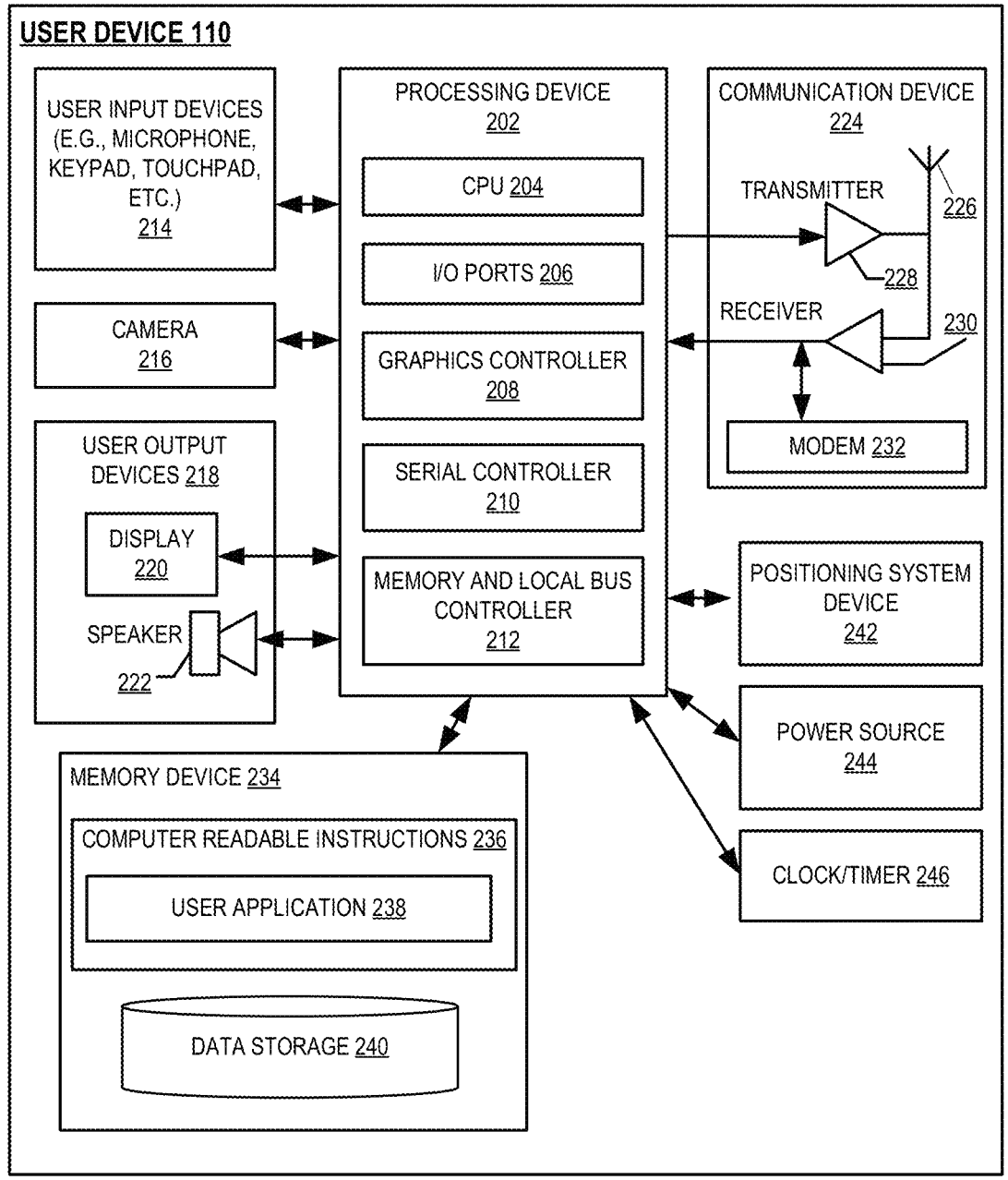
Figure 3:
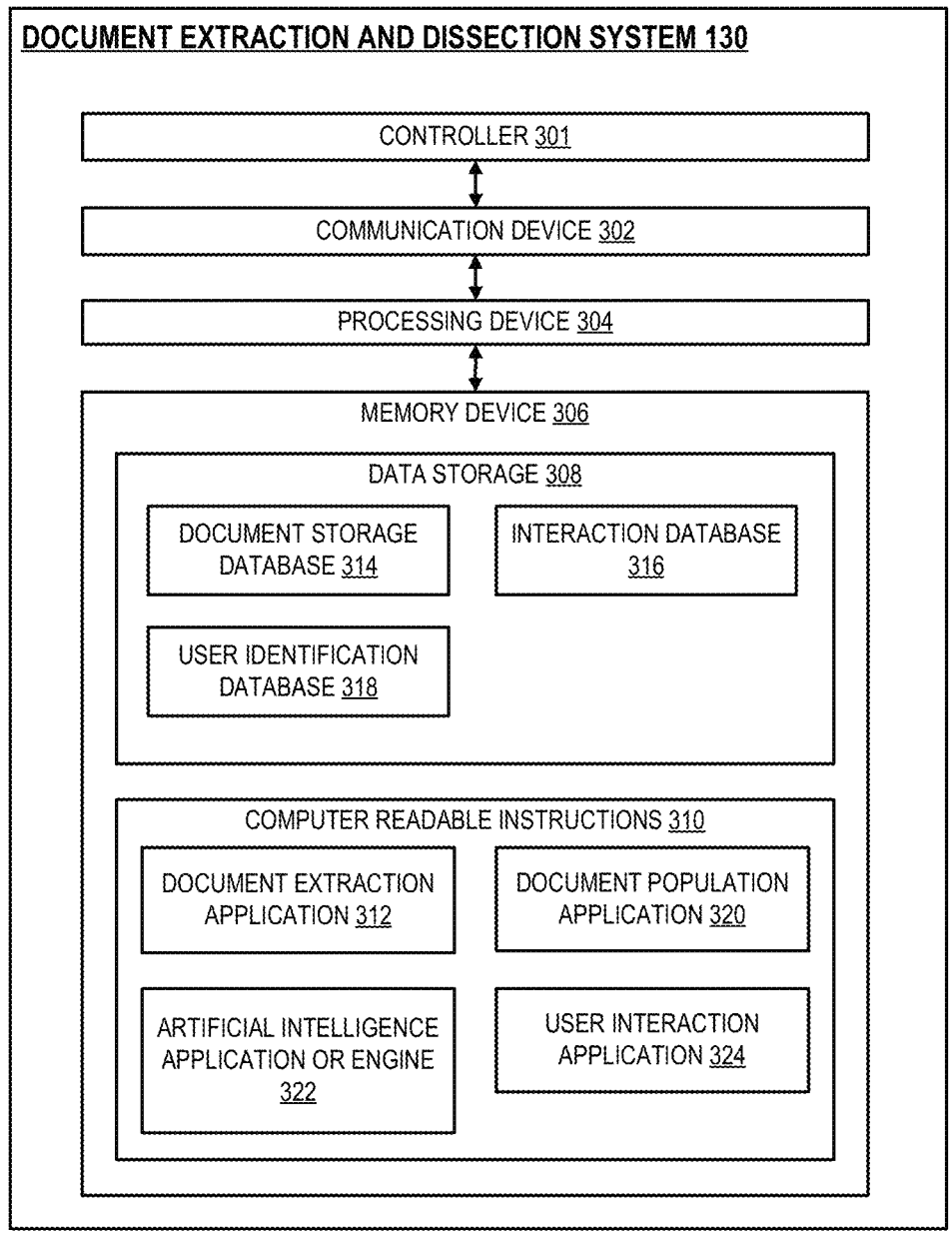
Figure 4:
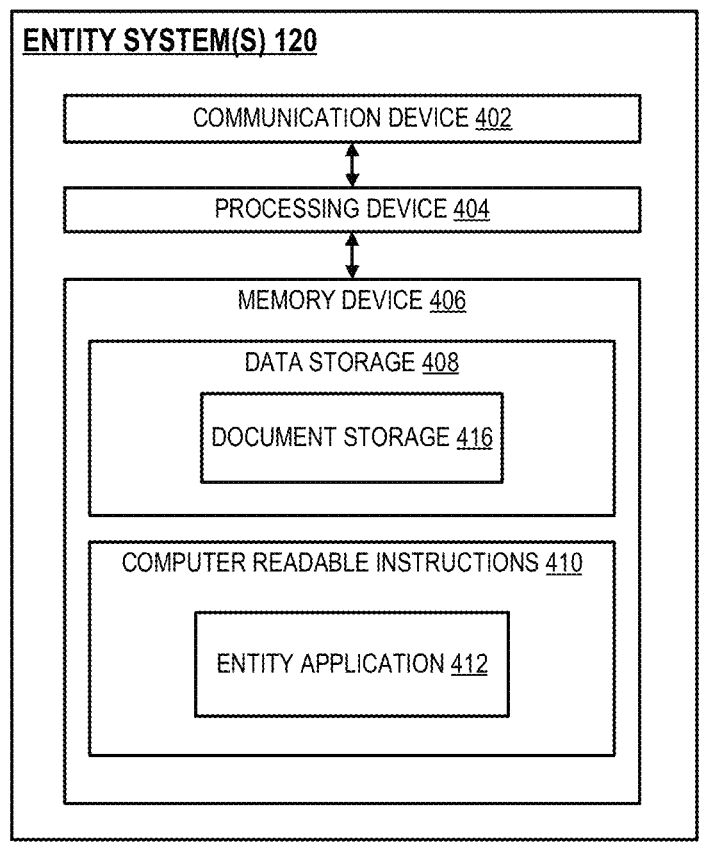
Figure 5:
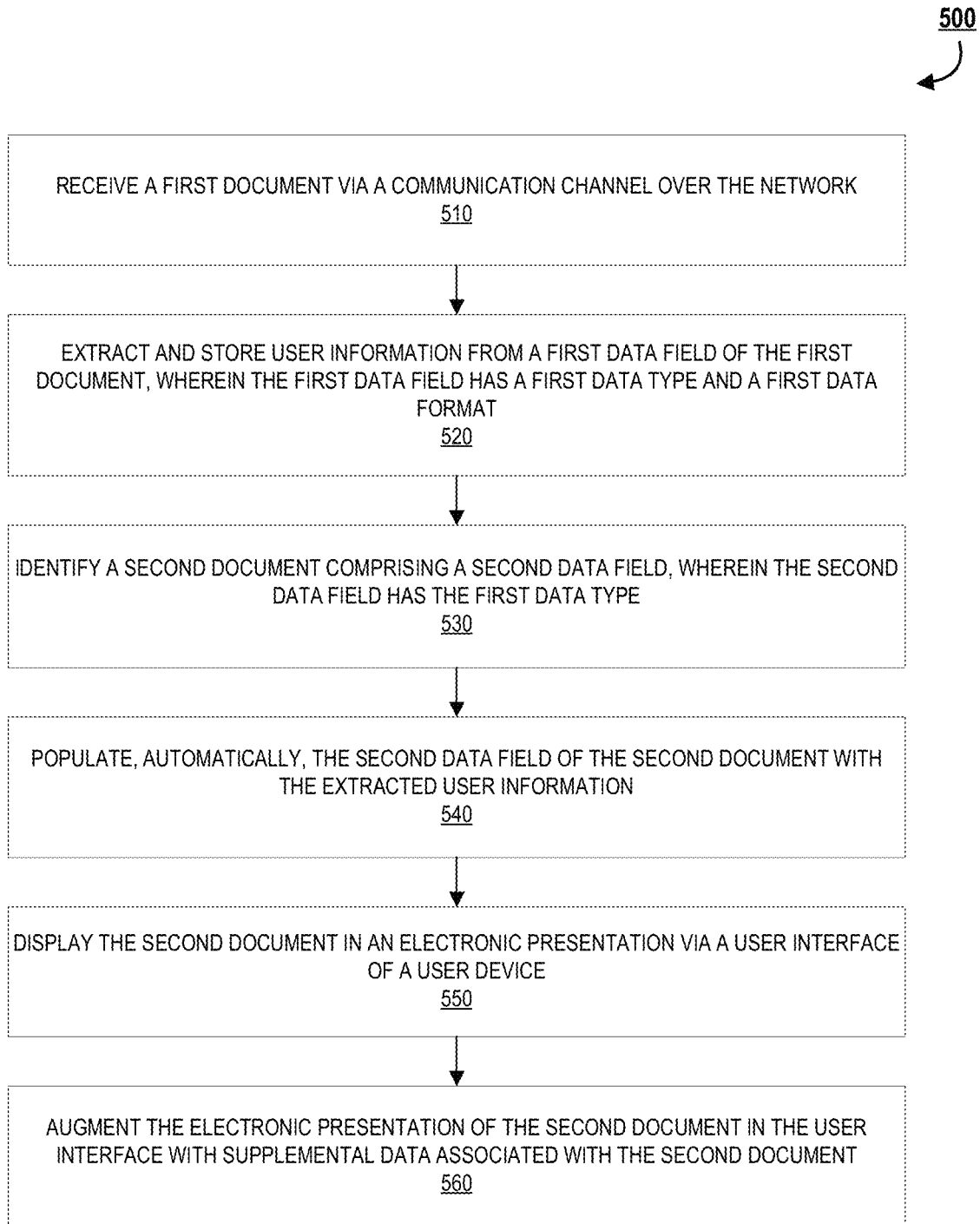

Having thus described embodiments of the invention in general terms, reference will now be made to the accompanying drawings, wherein:

FIG. 1 provides a document extraction and dissection system environment, in accordance with one embodiment of the invention;

FIG. 2 provides a block diagram of a user device, in accordance with one embodiment of the invention;

FIG. 3 provides a block diagram of a document extraction and dissection system, in accordance with one embodiment of the invention;

FIG. 4 provides a block diagram of an entity system, in accordance with one embodiment of the invention; and FIG. 5 provides a high level process flow for extracting and dissecting documents, in accordance with one embodiment of the invention.

DETAILED DESCRIPTION OF EMBODIMENTS OF THE INVENTION

Embodiments of the system, as described herein leverage artificial intelligence and other complex, specific-use computer systems to provide a novel approach for extracting and dissecting user documents with novel artificial intelligence-driven automatic document population and interactive document explanation. The system is configured to capture and process files, such as electronic document files, and extract user information or data from the captured documents. The system is configured to not only receive and extract user information from documents, but also employ the extracted data to intelligently populate additional documents for the user. For example, the system may be configured to utilize both internally-stored private data as well as publicly-available, external resources (e.g., third party data) associated with a user to populate documents.

While basic document auto-population methods exist, preexisting technologies may populate documents with limited data sources (i.e., without access to both internal and external data sources) and not provide explanations to a user who may be inclined to simply submit an automatically populated document with little understanding of the populated fields. These situations may lead to undesired document submission effects and/or incorrect population of document fields. In contrast, the system is further configured to provide on-demand explanations and supplemental information to users via a user interface presentation of the electronic document at the request of the user. In this way, the user may be well-informed as to the purpose of a document and/or data field while still benefitting from the convenience of the enhanced automatic population of the present systems.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the document extraction and dissection system. In some embodiments, a user may be a computing device user, a phone user, a mobile device application user, a customer of an entity or business, a system operator, and/or employee of an entity (e.g., a financial institution). In one embodiment, a user may be a customer accessing a user account via an associated user device, wherein files and/or data (e.g., documents) from an interaction between the user and an entity are analyzed or processed by the system. In a specific embodiment, a user is an account user transferring or submitting a file, such as document. In another specific embodiment, the file is an image file of a physical document such as a check, form, or the like wherein the system is configured to analyze and populate the document. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, global positioning system (GPS) devices, entertainment devices, or any combination of the aforementioned. The device may be used by the user to access the system directly or through an application, online portal, internet browser, virtual private network, or other connection channel. In another specific embodiment, the user device is a mobile device (e.g., a smart phone) associated with a user and configured with an image capture device for capturing a file or document for input and processing within the system. The user device comprises a display for providing a user interface to the user for interacting with an electronic image (e.g., completing an electronic document image).

As used herein, the term "entity" may be used to include any organization or collection of users that may interact with the document extraction and dissection system. An entity may refer to a business, company, or other organization that either maintains or operates the system or requests use and accesses the system. In one embodiment, the entity may be a financial entity. The terms "financial institution" and "financial entity" may be used to include any organization that processes financial transactions including, but not limited to, banks, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. In other embodiments, the entity may be a legal entity such as a firm, court, government institution, or the like that provides legal documents to a user.

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In another specific embodiment, monitoring may comprise identifying user information that may be populated into a document associated with the user. In other embodiments, monitoring may further comprise extracting external information from publicly-available third-party systems.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, text or data entry, highlighting, mousing-over, etc.), authentication actions (e.g., signing-in, username and password entry, PIN entry, etc.), account actions or events (e.g., account access, fund transfers, document or record views and/or transfers, etc.) and the like. In another example, an interaction may refer to a user communication via one or more channels (i.e., phone, email, text, instant messaging, brick-and-mortar interaction, and the like) with an entity and/or entity system to complete an operation or perform an action (e.g., complete a document).

FIG. 1 provides a document extraction and dissection system environment 100, in accordance with one embodiment of the invention. As illustrated in FIG. 1, document extraction and dissection system 130 is operatively coupled, via a network 101, to the user device(s) 110 (e.g., a plurality of user devices 110a-110d) and the entity system(s) 120. In this way, the document extraction and dissection system 130 can send information to and receive information from the user device 110 and the entity system 120. In the illustrated embodiment, the plurality of user devices 110a-110d provide a plurality of communication channels through which the entity system 120 and/or the document extraction and dissection system 130 may communicate with the user 102 over the network 101.

In the illustrated embodiment, the document extraction and dissection system 130 further comprises an artificial intelligence system 135 which may be separate systems operating together with the document extraction and dissection system 130 or integrated within the document extraction and dissection system 130. In some embodiments, the user interaction system 135 further includes an artificial intelligence (AI) assistant configured to interact with the user and bridge communications between the document extraction and dissection system 130 and the user device 110.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120 via a user device 110 while a data flow between the user device 110 and the entity system 120 is intercepted and monitored by the document extraction and dissection system 130 over the network 101. In some embodiments a user 102 is a user requesting service from the entity or interacting with a document provided by the entity system 120. In an alternative embodiment, the user 102 is an individual interacting with the document extraction and dissection system 130 over the network 101 and monitoring input of information from the entity systems 120 to the document extraction and dissection system 130 for processing and analysis (e.g., an employee of the entity operating and/or monitoring the systems 120, 130).

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. In one embodiment, the camera 216 may include a scanner or any other image capturing device configured to capture an image or collect data from a hardcopy record or document. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user application 238 is a document management application providing access to one or more documents maintained by the entity system 120 wherein the user may interact to complete the documents via a user interface of the user application 238. In one embodiment, the user application 238 may be configured to allow a user 102 to request, access, transfer, capture, view, fill, and/or otherwise interact with documents on the user device 110, wherein the electronic document files are provided and displayed to the user 102 on the user device 110. In one embodiment, the user application 238 comprises an AI assistant application configured to bridge communication between the document extraction and dissection system 130 and the user device 110 as discussed herein.

The processing device 202 may be configured to use the communication device 224 to communicate with one or more other devices on a network 101 such as, but not limited to the entity system 120 and the document extraction and dissection system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of a document extraction and dissection system 130, in accordance with one embodiment of the invention. The document extraction and dissection system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, third party systems 140, and/or the document extraction and dissection system 130, in order to interface and manage data flow between systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the document extraction and dissection system 130 comprises computer-readable instructions 310 stored in the memory device 306, which in one embodiment includes the computer-readable instructions 310 of a document extraction application 312, a document population application 320, an artificial intelligence application 322, and a user interaction application 324. The document extraction application 312 is configured to capture and process (i.e., extract or dissect data from) received documents while simultaneously being configured to identify document types and data types and formats of individual fields associated with a document. The document population application 320 is configured to automatically fill one or more portions of a document with user information extracted and stored in document storage database 314. The document population application 320 may operate intelligently through cooperation with the artificial intelligence application 322. As previously discussed, the user application 238 and the artificial intelligence application 322 are configured to bridge communication between the system 130, application 312, and the user device to enable near-real time communication and explainable document population. The user interaction application 324 may be configured to control all user interactions with a document presented to the user, wherein one or more actions may be triggered as a result of a user interaction. In one embodiment, the user interaction application 324 is configured to present explanations or other supplemental information to the user in response to a user interaction with the document.

In some embodiments, the memory device 306 includes data storage 308 for storing data related to the system environment, but not limited to data created and/or used by the document extraction application 312, document population application 320, the artificial intelligence application 322, and user interaction application 234. Data stored in the data storage 308 may comprise document storage database 314, an interaction database 316, and a user identification database 318.

Document storage database 314 is used to store electronic document files, data fields, data types, data formats, file images, and other document data used by the systems described herein. In some embodiments, the documents may include electronic records such as files, data, images, and the like. In a specific example, the electronic documents may include stored images of forms. While the document storage database 314 is shown in FIG. 3 as part of the document extraction and dissection system 130, in other embodiments, document storage may be included on one or more other systems (e.g., entity systems 120) to supplement or as an alternative to document storage 314 on the document extraction and dissection system 130. In one embodiment, documents are stored on the entity systems 120, wherein the document extraction and dissection system 130 pulls the files from the entity systems 120. The document extraction and dissection system 130 may intercept and modify a document captured using a user device 110 before the document is ultimately sent to an entity system 120.

The interaction database 316 is used to store information regarding past interactions (e.g., document populations, transactions, communications, inputs) during a session with the user 102. In some embodiments, the interaction database 316 may be configured to store data from an incoming data stream in real-time. The interaction database 316 may further include information or data related to the interactions such as user data, document extractions, document populations, and the like. The system may be configured to access and update stored information and data stored in the interaction database 316 as additional information is collected. In some embodiments, the interaction database 316 may include supplemental information for population of documents by the system (e.g., explanations, definitions, etc.). In some embodiments, the system is configured to supplement the information of the interaction database 316 with additional information collected from the web or other systems (i.e., third party systems) in real-time.

In one embodiment of the invention, the document extraction and dissection system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the document extraction and dissection system 130 may include multiple systems, servers, computers or the like maintained by one or many entities. In some embodiments, the document extraction and dissection system 130 may be part of the entity systems 120. In other embodiments, the entity systems 120 are distinct from the document extraction and dissection system 130. The document extraction and dissection system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110, the document extraction and dissection system 130, and the third party systems 140. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the document extraction and dissection system 130 to provide access to documents, files, and accounts stored and maintained on the entity systems 120. In some embodiments, the entity system 120 may communicate with the document extraction and dissection system 130 during an interaction with a user 102 in real-time, wherein user interactions may be monitored and processed by the document extraction and dissection system 130. In some embodiments, data storage 408 comprises document storage 416 to either supplement or replace the file storage 314 of the document extraction and dissection system 130 as previously discussed.

The systems of the environment 100 are used to capture and process files, such as electronic document files, and extract user information or data from the captured documents. The system is configured to not only receive and extract user information from documents, but also employ the extracted data to intelligently populate additional documents for the user. For example, the system may be configured to utilize both internally-stored private data as well as publicly-available, external resources (e.g., third party data) associated with a user to populate documents. The system is further configured to provide on-demand explanations and supplemental information to users via a user interface presentation of the electronic document at the request of the user. In this way, the user may be well-informed as to the purpose of a document and/or data field while still benefitting from the convenience of the enhanced automatic population of the present systems.

"Documents," as used herein, may refer to any form of physical document or data stored captured or collected by the system for processing. In one embodiment, a document, file, or record may include an image of a physical record such as a captured electronic image of a physical document. Physical documents, such as a form, a receipt, a check, a signature page, or the like may be captured by an image capture device associated with the system to generate an image of the document for electronic processing. In other embodiments, a document may be an electronic record such as an electronic file, recording, image, or other form of electronic information that may be stored.

The processes described herein by the invention utilize the system environment 100, in various embodiments, to extract user information from captured documents and intelligently populate other documents on behalf of user. FIG. 5 provides a high level process flow for extracting and dissecting documents, in accordance with one embodiment of the invention. As illustrated in block 510 of FIG. 5, the system first receives a first document via a communication channel over the network. The system is configured to receive documents via a plurality of communication channels such as various user devices as discussed with respect to FIG. 1.

In one embodiment, the system is configured to capture a document using a user device. The system may utilize an image capture device, scanner, or the like, such as camera 216, to capture an image of a physical document (e.g., a form). In some embodiments, capturing the document further comprises receiving or extracting a user input data field associated with the document or other data input by a user on the user device. The system includes an optical character recognition (OCR) module configured to dissect the document and extract or determine one or more image-derived data fields from the document. The captured image is analyzed by the system to determine data fields from the document for analysis. Alternatively, or in additional to scanning techniques, the system may be configured to receive user input associated with the one or more data fields, wherein the user may provide input via user interface for completing the document.

As illustrated in block 520, the system is configured to extract user information from data fields of a received or captured document. In one embodiment, the system is configured to receive a first data field from first document, wherein the first data field has a first data type and a first data format. A data type of a data field may refer to the type of user information extracted from, requested by, or otherwise associated with a particular data field. In a non-limiting example, a data type may include user information such as a name, address, or other user identifying information. A data type may specify a type of information required by the data field such as text, a number, a file attachment, or the like. Data types may further include, for example, text, images, audio, video, or the like of the identified data. A data format of a data field may refer to a required arrangement or presentation required for the user information of the data field. For example, the data format may include a specific date format (e.g., mm/dd/yyyy) or other arrangement of user information. In another example, a data format may include a language of the data.

In some embodiments, the system is configured to store extracted user information (i.e., data entry, data type, data format) and the associated document, wherein the information and document are uploaded to a document database. The document database provides a central repository for all information collected from various documents associated with a user, wherein the information may be later used for additional processing (e.g., automatic document population).

In some embodiments, extracting the user information further comprises extracting public external information from third party systems in addition to collecting the internal information from the received documents from the users. Non-limiting examples of third party systems may include publicly-accessible databases, web search results, and the like. The system is configured to merge the public external information the extracted user information in the document database, wherein the public external information and the extracted user information are used to populate additional documents as described below.

Having generated the document database comprising the user information, as illustrated in block 530, the system is configured to identify a second document. The second or additional document may comprise one or more additional data fields for completion (i.e., filling out or population). In one embodiment, the system identifies the relevant document based on identifying that a data field of the second document shares a data type with a data field from the document database. In another embodiment, the system may identify an additional document based on a request from the user, wherein the user provides an indication of an additional document to complete. In yet another embodiment, the system may determine additionally required documents associated through communication and instruction received from one or more of the entity systems or third party systems.

In some embodiments, the data fields of a previously extracted first document and an identified second document may share a data type but may or may not have the same data format. In some embodiments, the system further includes a data formatting application configured to transform the extracted user information from a first data format to a second data format. For example, data formatting application may be configured to convert a number format, a text format, a file format, or the like to a compatible format required by the second document being populated. In another example, the system may convert an entry from a first language format to a translated, second language format as requested by the user.

As illustrated in block 540, the system is configured to automatically populate the data fields of the second document with the extracted user information from the database. In some embodiments, populating the second document may comprise modifying the second document, wherein the system is configured to insert the extracted user information in the various data fields of the second document. As illustrated in block 550, the system is configured to display the second document in an electronic presentation via a user interface of a user device. For example, the system may display the second document on a user device for user review and interaction.

As illustrated in block 560, the system is configured to augment the electronic presentation of the second document in the user interface with supplemental data associated with the second document. The system may be configured to modify the electronic presentation (i.e., pixels in a displayed image, video, or the like) to display an augmented presentation to the user. In some embodiments, the system may place a marking, a highlight, inserted text, an image, a video, embedded audio, or the like in the presentation of the document on the user device.

In some embodiments, augmenting the electronic presentation of the second document in the user interface with the supplemental data comprises displaying an explanation of the at least a portion of the second document. The displayed explanation may be associated with the document itself, one or more specific data fields, one or more related additional documents, instructions for completing the document, or the like. In some embodiments, the system is configured to generate an explanation associated with a document based on an identified document type, data type, and/or format type associated with the document. The supplemental explanation associated with the document may be presented by the system with the document for the user's benefit. In some embodiments, an explanation displayed by the system in the augmented document may include a definition, a language translation, or the like.

In some embodiments, the system may be prompted by the user to present supplemental information, such as explanation information, within a displayed document. The system may be configured to display the supplemental information in response to a user interaction with at least a portion of the displayed document via a user interface. Non-limiting examples of the user interaction detectable by the system through the user interface include user markings on the document, manipulation of the document, a click via the user interface, a highlight of information, a mouseover or hover of information, an amount of view-time on the user interface by the user or the like. For example, the user may highlight a portion of the document and in response the system is configured to provide supplemental information (e.g., an explanation) associated with the highlighted portion. Alternatively, the system is configured to highlight portions of the document for portions requiring user review and completion (e.g., those portions of the document not automatically populated by the system).

In some embodiments, the augmented electronic presentation of the document is only presented to the user via the user interface of the user device, wherein the augmented portions are not saved and/or displayed in the document if submitted, printed, mailed, or otherwise transmitted to another user. In other embodiments, the system may enable the user to save an augmented document with the supplemental information or explanations for later reference.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with document extraction and dissection.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for document extraction and dissection, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for document extraction and targeted dissection, the system comprising:
   a memory device with computer-readable program code stored thereon;
   a communication device connected to a network; and
   a processing device, wherein the processing device is configured to execute the computer-readable program code to:
   receive a first document via a communication channel over the network;
   extract user information from a first data field of the first document;
   identify that the first data field has a first data type and a first data format;
   store the user information and the first document in a document database;
   extract supplemental information from an interaction database, wherein the extracted supplemental information comprises definitions associated with the first document and additional information collected from web search results in real-time;
   merge the extracted supplemental information with the user information in the document database;
   receive instructions from an entity system that a second document is required to be associated with the first document, wherein the second document comprises a second data field;
   identify, in response to receiving the instructions from the entity system, that the second data field has the first data type;
   populate, automatically and in response to identifying that the second data field has the first data type, the second data field of the second document with the user information;
   display the second document, with the user information in the second data field, in an electronic presentation via a user interface of a user device;
   generate, in response to identifying that the second data field has the first data type, an explanation based on the first data type, wherein the explanation comprises video and the extracted supplemental information from the document database, wherein the extracted supplemental information in the explanation comprises the definitions and the additional information collected from the web search results;
   augment the electronic presentation of the second document in the user interface with the explanation comprising the definitions and the additional information collected from the web search results;
   receive, from the user device, a request to translate the user information in the second data field to a second language format; and
   convert, in response to receiving the request, the user information in the second data field from a first language format to the second language format.

2. The system of claim 1, wherein the augmented electronic presentation is only displayed with the second document in the user interface, and wherein the processing device is further configured to:
   transmit the electronic presentation of the second document to another user without the explanation; and
   save the augmented electronic presentation.

3. The system of claim 1, wherein the second document has a second data format different than the first data format, and wherein the processing device is further configured to transform the extracted user information from the first data format to the second data format.

4. The system of claim 1, wherein the processing device is further configured to:
   display the augmented electronic presentation;
   identify a document type of the second document;
   generate another explanation based on the document type of the second document; and
   augment the second document with the other explanation, wherein the other explanation comprises at least one of text, an image, audio, or video.

5. The system of claim 1, wherein the processing device is further configured to receive an interaction with a portion of the second document from a user via the user interface; and
   in response to receiving the interaction, display the augmented electronic presentation.

6. The system of claim 5, wherein the interaction with the portion of the second document comprises a click, a highlight, a mouseover, or an amount of view-time on the user interface by the user.

7. The system of claim 1, wherein extracting the user information further comprises extracting public external information from third party systems.

8. The system of claim 7, wherein the processing device is further configured to merge the public external information with the extracted user information in the document database, and wherein the public external information and the extracted user information are used to populate the second document.

9. The system of claim 1 further comprising an artificial intelligence application stored in the memory device and in communication with the document database, wherein the processing device, using the artificial intelligence application, is further configured to populate the second document and retrieve the supplemental information.

10. A computer-implemented method for document extraction and targeted dissection, the computer-implemented method comprising:
    receiving a first document via a communication channel over a network;
    extracting user information from a first data field of the first document;
    identifying that the first data field has a first data type and a first data format;
    storing the user information and the first document in a document database;
    extracting supplemental information from an interaction database, wherein the extracted supplemental information comprises definitions associated with the first document and additional information collected from web search results in real-time;
    merging the extracted supplemental information with the user information in the document database;
    receiving instructions from an entity system that a second document is required to be associated with the first document, wherein the second document comprises a second data field;
    identifying, in response to receiving the instructions from the entity system, that the second data field has the first data type;
    populating, automatically and in response to identifying that the second data field has the first data type, the second data field of the second document with the user information;
    displaying the second document, with the user information in the second data field, in an electronic presentation via a user interface of a user device;
    generating, in response to identifying that the second data field has the first data type, an explanation based on the first data type, wherein the explanation comprises video and the extracted supplemental information from the document database, wherein the extracted supplemental information in the explanation comprises the definitions and the additional information collected from the web search results;
    augmenting the electronic presentation of the second document in the user interface with the explanation comprising the definitions and the additional information collected from the web search results;
    receiving, from the user device, a request to translate the user information in the second data field to a second language format; and
    converting, in response to receiving the request, the user information in the second data field from a first language format to the second language format.

11. The computer-implemented method of claim 10, wherein the augmented electronic presentation is only displayed with the second document in the user interface, and wherein the computer-implemented method comprises:
    transmitting the electronic presentation of the second document to another user without the explanation; and
    saving the augmented electronic presentation.

12. The computer-implemented method of claim 10, wherein the second document has a second data format different than the first data format, and further comprising transforming the extracted user information from the first data format to the second data format.

13. The computer-implemented method of claim 10, comprising:
    displaying the augmented electronic presentation;
    identifying a document type of the second document;
    generating another explanation based on the document type of the second document; and
    augmenting the second document with the other explanation, wherein the other explanation comprises at least one of text, an image, audio, or video.

14. The computer-implemented method of claim 10, further comprising receiving an interaction with a portion of the second document from a user via the user interface; and
    in response to receiving the interaction, displaying the augmented electronic presentation.

15. The computer-implemented method of claim 14, wherein the interaction with the portion of the second document comprises a click, a highlight, a mouseover, or an amount of view-time on the user interface by the user.

16. The computer-implemented method of claim 10, wherein extracting the user information further comprises extracting public external information from third party systems.

17. The computer-implemented method of claim 16 further comprising merging the public external information with the extracted user information in the document database, wherein the public external information and the extracted user information are used to populate the second document.

18. The computer-implemented method of claim 10 further comprising populating the second document and retrieving the supplemental information using an artificial intelligence application in communication with the document database.

19. A computer program product for document extraction and targeted dissection, wherein the computer program product comprises a non-transitory computer-readable medium comprising computer-readable instructions, the computer-readable instructions, when executed by a processing device, cause the processing device to:
- receive a first document via a communication channel over a network;
- extract user information from a first data field of the first document;
- identify that the first data field has a first data type and a first data format;
- store the user information and the first document in a document database;
- extract supplemental information from an interaction database, wherein the extracted supplemental information comprises definitions associated with the first document and additional information collected from web search results in real-time;
- merge the extracted supplemental information with the user information in the document database;
- receive instructions from an entity system that a second document is required to be associated with the first document, wherein the second document comprises a second data field;
- identify, in response to receiving the instructions from the entity system, that the second data field has the first data type;
- populate, automatically and in response to identifying that the second data field has the first data type, the second data field of the second document with the user information;
- display the second document, with the user information in the second data field, in an electronic presentation via a user interface of a user device;
- generate, in response to identifying that the second data field has the first data type, an explanation based on the first data type, wherein the explanation comprises video and the extracted supplemental information from the document database, wherein the extracted supplemental information in the explanation comprises the definitions and the additional information collected from the web search results;
- augment the electronic presentation of the second document in the user interface with the explanation comprising the definitions and the additional information collected from the web search results;
- receive, from the user device, a request to translate the user information in the second data field to a second language format; and
- convert, in response to receiving the request, the user information in the second data field from a first language format to the second language format.

20. The computer program product of claim 19, wherein the augmented electronic presentation is only displayed with the second document in the user interface, and the computer-readable instructions, when executed by a processing device, cause the processing device to:
- transmit the electronic presentation of the second document to another user without the explanation; and
- save the augmented electronic presentation.

* * * * *